US007525942B2

(12) United States Patent
Cordone (10) Patent No.: US 7,525,942 B2
(45) Date of Patent: Apr. 28, 2009

(54) METHOD AND APPARATUS FOR DETECTING INTERFERENCE USING CORRELATION

(75) Inventor: Sean S. Cordone, Chicago, IL (US)

(73) Assignee: Isco International, Inc., Elk Grove Village, IL (US)

( * ) Notice: Subject to any disclaimer, the term of this patent is extended or adjusted under 35 U.S.C. 154(b) by 188 days.

(21) Appl. No.: 11/217,717

(22) Filed: Sep. 1, 2005

(65) Prior Publication Data

US 2007/0047494 A1    Mar. 1, 2007

(51) Int. Cl.
*H04B 7/216* (2006.01)
(52) U.S. Cl. .................. 370/335; 370/310; 370/310.2; 370/338; 455/63.1; 455/65; 455/67.13; 455/114.2; 455/296; 455/501
(58) Field of Classification Search .......... 370/310, 370/310.2, 335, 338; 455/63.1, 65, 67.13, 455/114.2, 296, 501
See application file for complete search history.

(56) References Cited

U.S. PATENT DOCUMENTS

| 3,732,500 | A | 5/1973 | Dishal et al. |
| 3,781,705 | A | 12/1973 | Dishal et al. |
| 3,783,397 | A | 1/1974 | Dishal et al. |
| 3,911,366 | A | 10/1975 | Baghdady |
| 4,027,264 | A | 5/1977 | Gutleber |
| 4,328,591 | A | 5/1982 | Baghdady |
| 4,513,249 | A | 4/1985 | Baghdady |
| 4,859,958 | A | 8/1989 | Myers |
| 4,992,747 | A | 2/1991 | Myers |
| 5,038,115 | A | 8/1991 | Myers et al. |
| 5,168,508 | A | 12/1992 | Iwasaki et al. |
| 5,185,762 | A | 2/1993 | Schilling |
| 5,226,057 | A | 7/1993 | Boren |
| 5,263,048 | A | 11/1993 | Wade |
| 5,303,413 | A | 4/1994 | Braegas et al. |
| 5,307,517 | A | 4/1994 | Rich |
| 5,325,204 | A | 6/1994 | Scarpa |
| 5,343,496 | A | 8/1994 | Honig et al. |
| 5,497,505 | A * | 3/1996 | Koohgoli et al. ......... 455/452.1 |
| 5,500,872 | A * | 3/1996 | Kinney et al. ............. 375/150 |

(Continued)

FOREIGN PATENT DOCUMENTS

CA    2260653    1/1999

(Continued)

OTHER PUBLICATIONS

International Search Report dated Jan. 18, 2007, for International Application No. PCT/US2006/034041.

(Continued)

*Primary Examiner*—Stephen M D'Agosta
(74) *Attorney, Agent, or Firm*—Marshall, Gerstein & Borun LLP (57) ABSTRACT

A system and/or a method for detecting interference using correlation may be used in a communication system to protect against, or to report the presence of, narrowband interference, which has deleterious effects on the performance of the wideband communication system. The interference detection system described herein may be used to determine presence of narrowband interference by calculating correlation factors for a plurality of narrowband channels disposed within the wideband communication system and comparing the correlation factors with a threshold correlation factor.

16 Claims, 8 Drawing Sheets

U.S. PATENT DOCUMENTS

| | | | |
|---|---|---|---|
| 5,541,959 | A | 7/1996 | Myers |
| 5,570,350 | A | 10/1996 | Myer et al. |
| 5,640,385 | A | 6/1997 | Long et al. |
| RE35,650 | E | 11/1997 | Partyka et al. |
| 5,703,874 | A | 12/1997 | Schilling |
| 5,758,275 | A | 5/1998 | Cox et al. |
| 5,822,373 | A | 10/1998 | Addy |
| 5,926,761 | A | 7/1999 | Reed et al. |
| 5,966,657 | A * | 10/1999 | Sporre .................. 455/425 |
| 5,970,105 | A | 10/1999 | Dacus |
| 5,974,101 | A * | 10/1999 | Nago ..................... 375/350 |
| 5,978,362 | A | 11/1999 | Lee et al. |
| 6,005,899 | A * | 12/1999 | Khayrallah ............. 375/343 |
| 6,020,783 | A | 2/2000 | Coppola |
| 6,035,213 | A | 3/2000 | Tokuda et al. |
| 6,047,175 | A * | 4/2000 | Trompower ............ 455/452.1 |
| 6,104,934 | A | 8/2000 | Patton et al. |
| 6,127,962 | A | 10/2000 | Martinson et al. |
| 6,215,812 | B1 * | 4/2001 | Young et al. ............ 375/144 |
| 6,313,620 | B1 | 11/2001 | Richardson et al. |
| 6,327,312 | B1 | 12/2001 | Jovanovich et al. |
| 6,393,284 | B1 | 5/2002 | Dent |
| 6,718,166 | B2 | 4/2004 | Cordone et al. .......... 455/306 |
| 6,807,405 | B1 | 10/2004 | Jagger |
| 6,959,170 | B2 * | 10/2005 | Vannatta et al. ......... 455/67.11 |
| 7,054,396 | B2 * | 5/2006 | Shan ..................... 375/346 |
| 2002/0057751 | A1 | 5/2002 | Jagger et al. |
| 2002/0155812 | A1 * | 10/2002 | Takada ................... 455/63 |
| 2003/0123530 | A1 * | 7/2003 | Maeda et al. ............ 375/148 |
| 2007/0183483 | A1 * | 8/2007 | Narayan et al. ......... 375/148 |

FOREIGN PATENT DOCUMENTS

| | | |
|---|---|---|
| CA | 2288633 | 4/2000 |
| EP | 0 704 986 A2 | 4/1996 |
| EP | 0 704 986 A3 | 4/1996 |
| EP | 0 812 069 A2 | 12/1997 |
| WO | WO-00/46929 | 8/2000 |

OTHER PUBLICATIONS

H. Vincent Poor, et al., "Narrowband Interference Suppression in Spread Spectrum CDMA", IEEE Personal Communications Magazine, Third Quarter, 1994, pp. 14-27.

L. Milstein, "Interference Rejection Techniques in Spread Spectrum Communications", Proceedings of the IEEE, vol. 76, No. 6, Jun. 1988.

Salgado-Galicia, Hector, et al. "A Narrowband Approach to Efficient PCS Spectrum Sharing Through Decentralized DCA Access Policies," IEEE Personal Communications, Feb. 1997, pp. 24-34.

* cited by examiner

METHOD AND APPARATUS FOR DETECTING INTERFERENCE USING CORRELATION

TECHNICAL FIELD

The present invention is directed to communication systems and, more particularly, to a wireless communication system operating in the radio frequency spectrum.

BACKGROUND ART

Wireless communication systems are an integral component of the ongoing technology revolution. Mobile radio communication systems, such as cellular telephone systems that provide mobile communications for wide areas of coverage, are evolving at an exponential rate. The wireless networks have become so popular that they essentially replace the traditional wired networks for users in large areas.

Wireless systems can be classified according to the method used to provide access to multiple users seeking to utilize the system in parallel, such as Time Division Multiple Access System (TDMA), Code Division Multiple Access (CDMA), etc. Generally, CDMA is a type of modulation also known as Direct Sequence Spread Spectrum (DSSS). In a DSSS system, channels are defined by complementary, orthogonal or pseudo-random spreading sequences or codes, where each user is assigned a unique spreading sequence. The spreading sequence has a frequency much higher than that of a user's information signal. DSSS signals have spectral characteristics of bandwidth limited white noise in the radio frequency (RF) spectrum. Typically, such a DSSS signal is likely to have one or more interference signals present. The task of identifying interference in a DSSS signal represents a classic detection-of-signals-in-noise problem, where the "noise" that needs to be detected is in fact a signal in a spectrum whose characteristics are similar to white noise. In other words, the white noise is the signal that needs to be preserved, and the narrow band interference signal is undesired.

Figure 1:
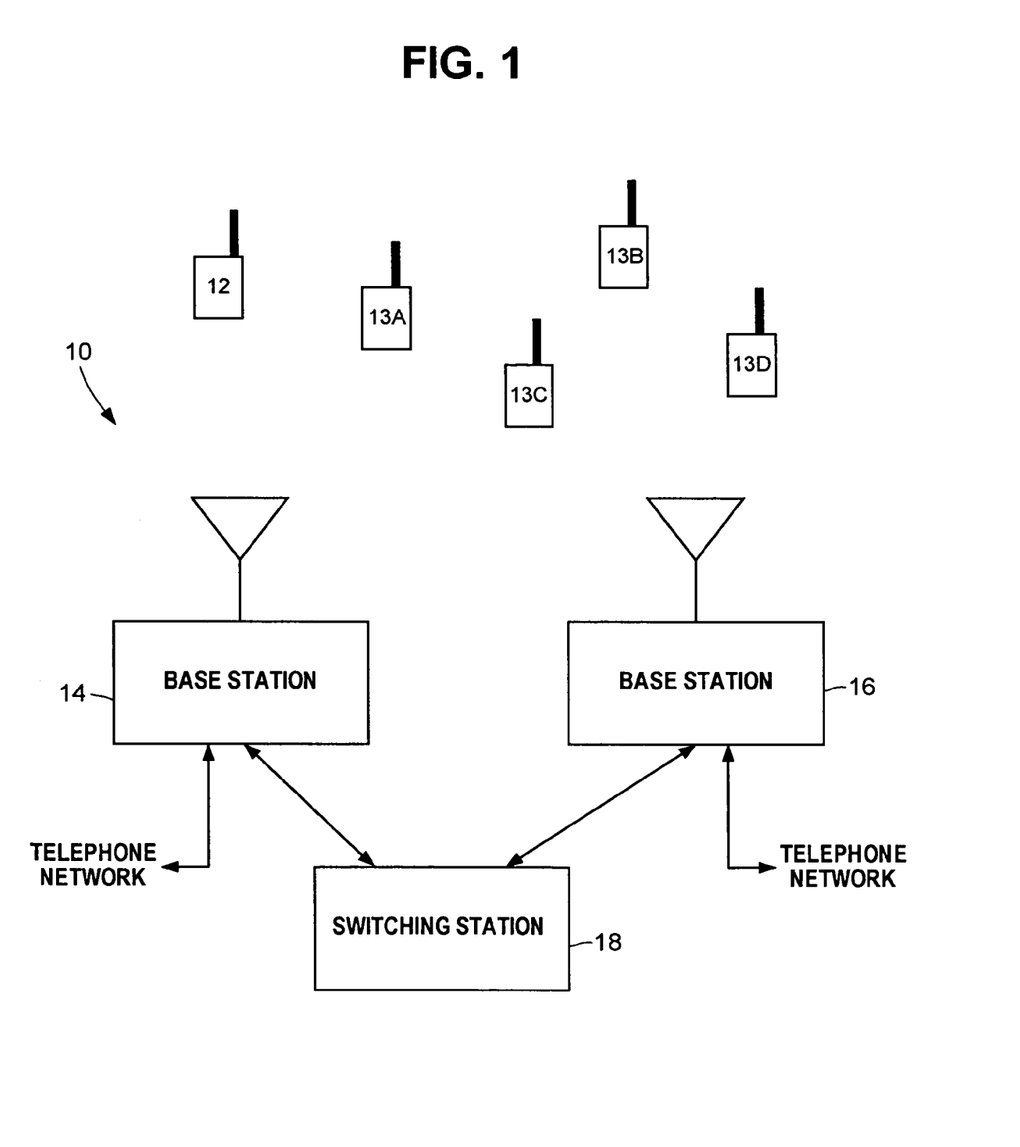
FIG. 1 is an exemplary illustration of a communication system.

FIG. 1 illustrates an exemplary telecommunication system 10, which may include mobile units 12, 13A, 13B, 13C, and 13D, a number of base stations, two of which are shown in FIG. 1 at reference numerals 14 and 16, and a switching station 18 to which each of the base stations 14, 16 may be interfaced. The base stations 14, 16 and the switching station 18 may be collectively referred to as network infrastructure.

During operation, the mobile units 12, 13A, 13B, 13C, and 13D exchange voice, data or other information with one of the base stations 14, 16, each of which is connected to a conventional land line telephone network. For example, information, such as voice information, transferred from the mobile unit 12 to one of the base stations 14, 16 is coupled from the base station to the telephone network to thereby connect the mobile unit 12 with a land line telephone so that the land line telephone may receive the voice information. Conversely, information such as voice information, may be transferred from a land line telephone to one of the base stations 14, 16, wherein the base station in turn transfers the information to the mobile unit 12.

The mobile units 12, 13A, 13B, 13C, and 13D and the base stations 14, 16 may exchange information in either analog or digital format. For the purposes of this description, it is assumed that the mobile unit 12 is a narrowband digital unit and that the mobile units 13A, 13B, 13C, and 13D are wideband digital units. Additionally, it is assumed that the base station 14 is a narrowband digital base station that communicates with the mobile unit 12 and that the base station 16 is a wideband digital base station that communicates with the mobile units 13A, 13B, 13C, and 13D using DSSS signals.

Digital format communication may take place using, for example, narrowband 200 kilohertz (kHz) channels. The Groupe Spécial Mobile (GSM) system is one example of a digital communication system in which the mobile unit 12 communicates with the base station 14 using narrowband channels. The mobile units 13A, 13B, 13C, and 13D communicate with the base stations 16 using a form of DSSS signal, such as, for example, code-division multiple access (CDMA) signal. CDMA digital communication takes place using spread spectrum techniques that broadcast signals having wide bandwidths, such as, for example, 1.2288 megahertz (MHz) bandwidths. Generally, a channel having a bandwidth that is substantially smaller than a wideband channel, it is referred to as a narrowband channel. For example, an RF power generated by an inter-modulation product, a harmonic signal, etc., may be generally referred to as a narrowband signal.

The switching station 18 is generally responsible for coordinating the activities of the base stations 14, 16 to ensure that the mobile units 12, 13A, 13B, 13C, and 13D are constantly in communication with the base station 14, 16 or with some other base stations that are geographically dispersed. For example, the switching station 18 may coordinate communication handoffs of the mobile unit 12 between the base stations 14 and another analog base station as the mobile unit 12 roams between geographical areas that are covered by the two base stations.

One particular problem that may arise in the telecommunication system 10 is when the mobile unit 12 or the base station 14, each of which communicates using narrowband channels, interferes with the ability of the base station 16 to receive and process wideband digital signals from the digital mobile units 13A, 13B, 13C, and 13D. In such a situation, the narrowband signal transmitted from the mobile unit 12 or the base station 14 may interfere with the ability of the base station 16 to properly receive wideband communication signals.

Figure 2:
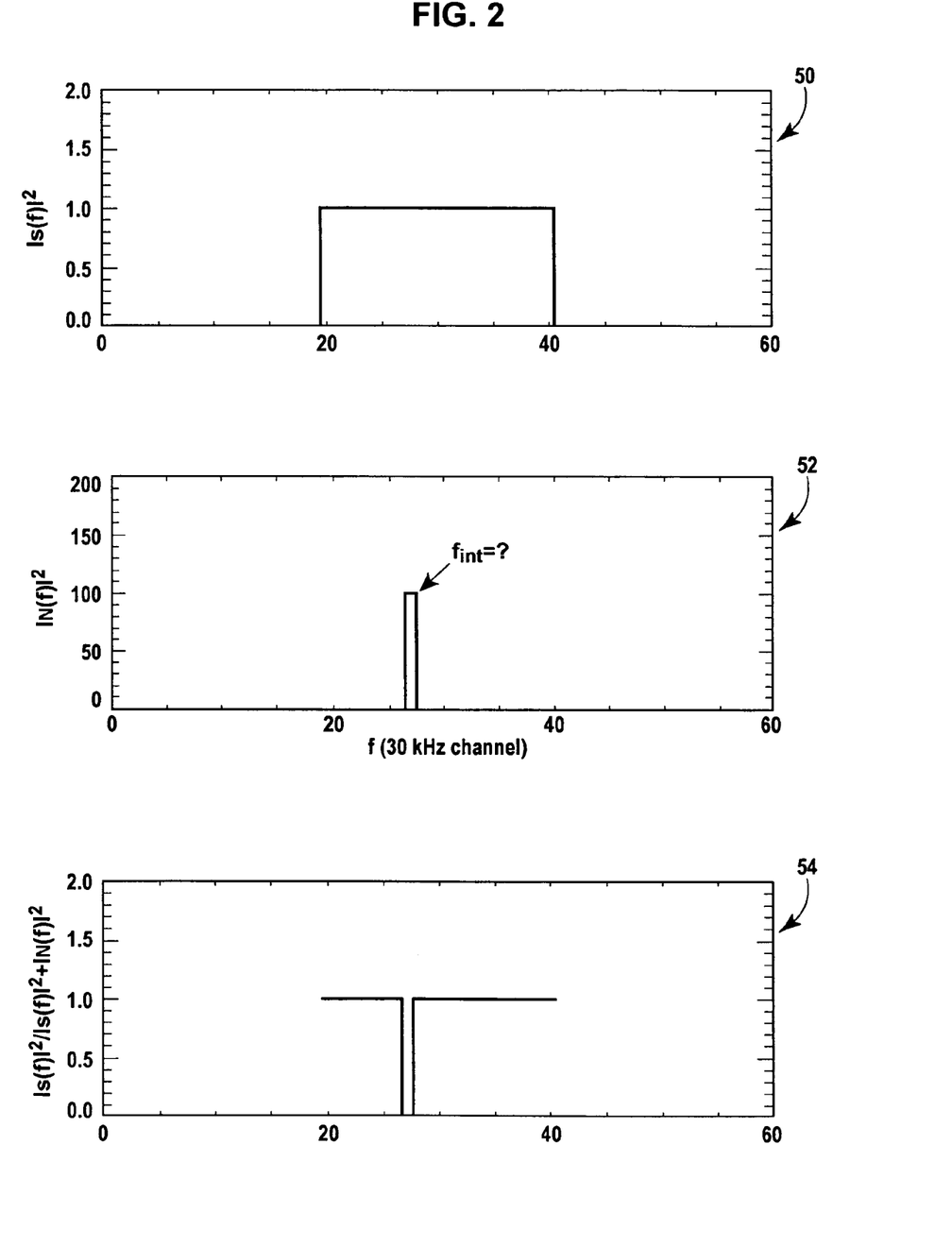
FIG. 2 is an exemplary illustration of frequency spectrums of a DSSS signal and a narrowband digital carrier signal.

FIG. 2 illustrates a typical frequency bandwidth of a telecommunication system using DSSS system. In particular FIG. 2 illustrates a frequency spectrum 50 of a 1.288 MHz DSSS system used by the digital mobile units 13A, 13B, 13C, and 13D to communicate with the base station 16, and a 200 kHz frequency spectrum 52 used by the module unit 12 using a narrowband digital communication system. It would be obvious to one of ordinary skill in the art that at times, the digital signal shown in 52 may interfere with the frequency spectrum 50.

If a filter were to be designed to remove the interference caused by the 200 kHz analog signal 52 from the DSSS signal 50, the transfer function of such a filter may be given by:

$$\Phi(f) = \frac{|S(f)|^2}{|S(f)|^2 + |N(f)|^2} \quad (1)$$

Wherein $|S(f)|^2$ is the power spectral density (PSD) of the desired signal and $|N(f)|^2$ is an estimate the PSD of the interference (noise) signal. If the nature of the interfering signal (noise term N) is assumed to be that given by the analog interference signal 52, the shape of the filter may be given as shown by a notch frequency spectrum 54 illustrated in FIG. 2. However, the frequency at which the notch filter should be placed is unknown in general. For effective application of the notch filter having the notch frequency spectrum 54, it is necessary to determine the location of the interference signal 52.

BRIEF DESCRIPTION OF THE DRAWINGS

The present patent is illustrated by way of examples and not limitations in the accompanying figures, in which like references indicate similar elements, and in which.

DESCRIPTION OF THE EMBODIMENTS

As disclosed in detail hereinafter, a system and/or a method for detecting interference using correlation may be used in a communication system to protect against, or to report the presence of, narrowband interference, which has deleterious effects on the performance of the wideband communication system. The interference detection system described herein may be used to determine presence of narrowband interference by calculating correlation factors for a plurality of narrowband channels disposed within the wideband communication system and comparing the correlation factors with a threshold correlation factor.

Figure 3:
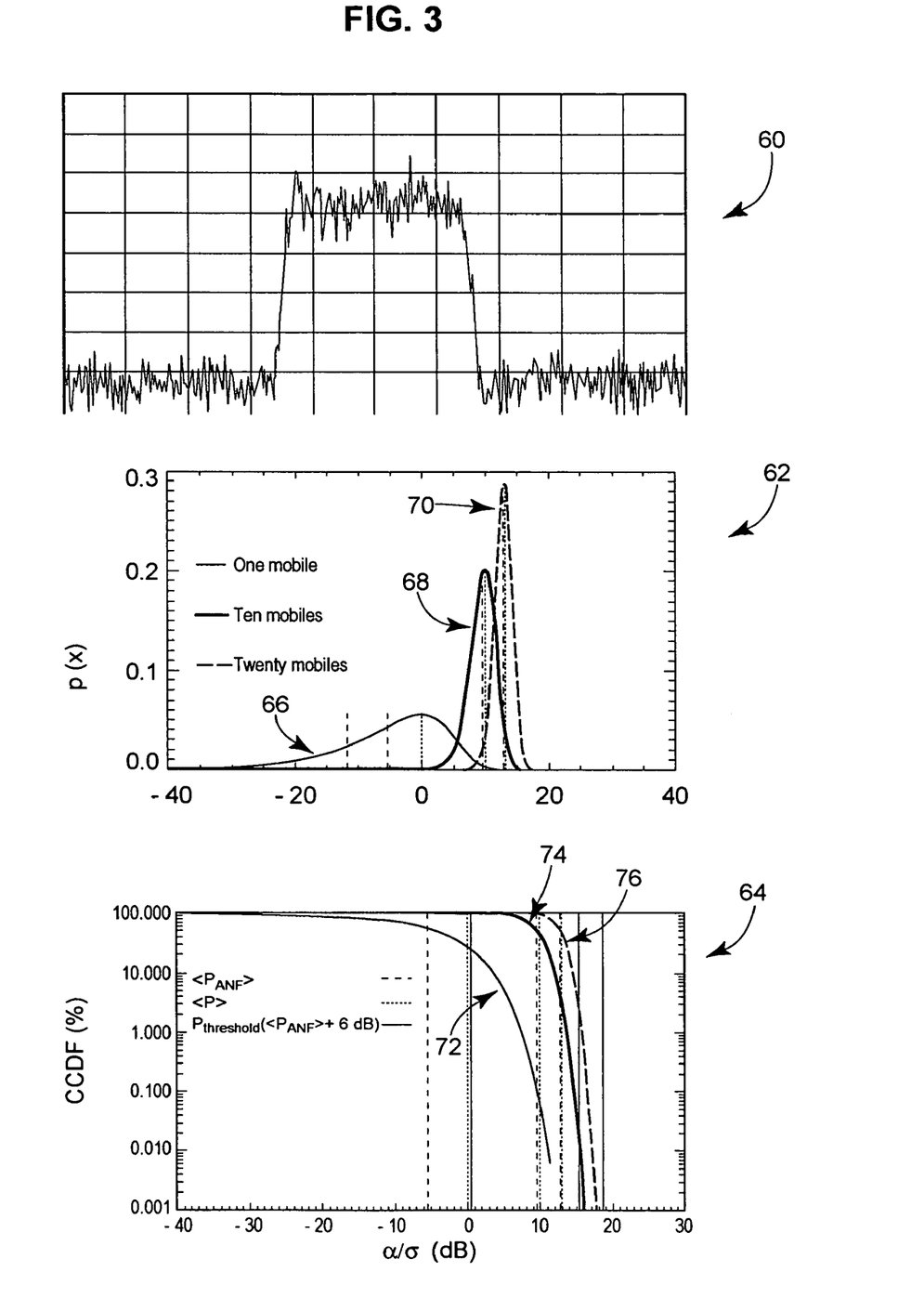
FIG. 3 is an exemplary illustration of a frequency spectrum of a DSSS signal.

FIG. 3 illustrates an IS-95 CDMA signal 60, which is a generic DSSS signal. The CDMA signal 60 may have a bandwidth of 1.2288 MHz and it may be used to carry up to 41 narrowband channels, each of which has a bandwidth of 30 kHz. One way to identify interference affecting the CDMA signal 60 may be to identify any of such 41 narrowband channels having excess power above an expected power of the CDMA signal 60. FIG. 3 also illustrates the probability distribution functions (PDFs) 62 of a typical DSSS signal and a complementary cumulative distribution functions (CCDFs) 64 of a typical DSSS signal, which may be used to establish a criteria used to determine narrowband channels disposed within a wideband signal and having excess power.

Specifically, the PDFs 62 include probability distribution of power in a given channel, which is the likelihood p(x) of measuring a power x in a given channel, for a DSSS signal carrying one mobile unit (66), for a DSSS signal carrying ten mobile units (68), and for a DSSS signal carrying twenty mobile units (70). For example, for the PDF 66, representing a DSSS signal carrying one mobile unit, the distribution p(x) is observed to be asymmetric, with an abbreviated high power tail. In this case, any channel having power higher than the high power tail of the PDF 66 may be considered to have an interference signal.

The CCDFs 64 denote the likelihood that a power measurement in a channel will exceed a given mean power $\alpha$, by some value $\alpha/\sigma$, wherein $\sigma$ is standard deviation of the power distribution. Specifically, the CCDFs 64 include an instance of CCDF for a DSSS signal carrying one mobile unit (72), an instance of CCDF for a DSSS signal carrying ten mobile units (76), and an instance of CCDF for a DSSS signal carrying twenty mobile units (76). Thus, for example, for a DSSS signal carrying one mobile unit, the likelihood of any narrowband channel having the ratio $\alpha/\sigma$ of 10 dB or more is 0.01%. Therefore, an optimal filter (as given by equation 1) should be tuned to such a narrowband channel having excess power.

One method of detecting such a narrowband channel having interference is by exploiting the noise like characteristic of a DSSS signal. Due to such noise like characteristic of DSSS signal, a particular measurement of a narrowband channel power gives no predictive power as to what the next measurement of the same measurement channel may be. In other words, consecutive observations of power in a given narrowband channels are un-correlated. As a result, if a given measurement of power in a narrowband channel provides predictive power over subsequent measurements of power in that particular channel, thus indicating a departure from statistics expected of a narrowband channel without interference, such a narrowband channel may be determined to contain interference. A method of determining such a narrowband channel having interference is illustrated in the following FIGS. 4 and 5.

Figure 4:
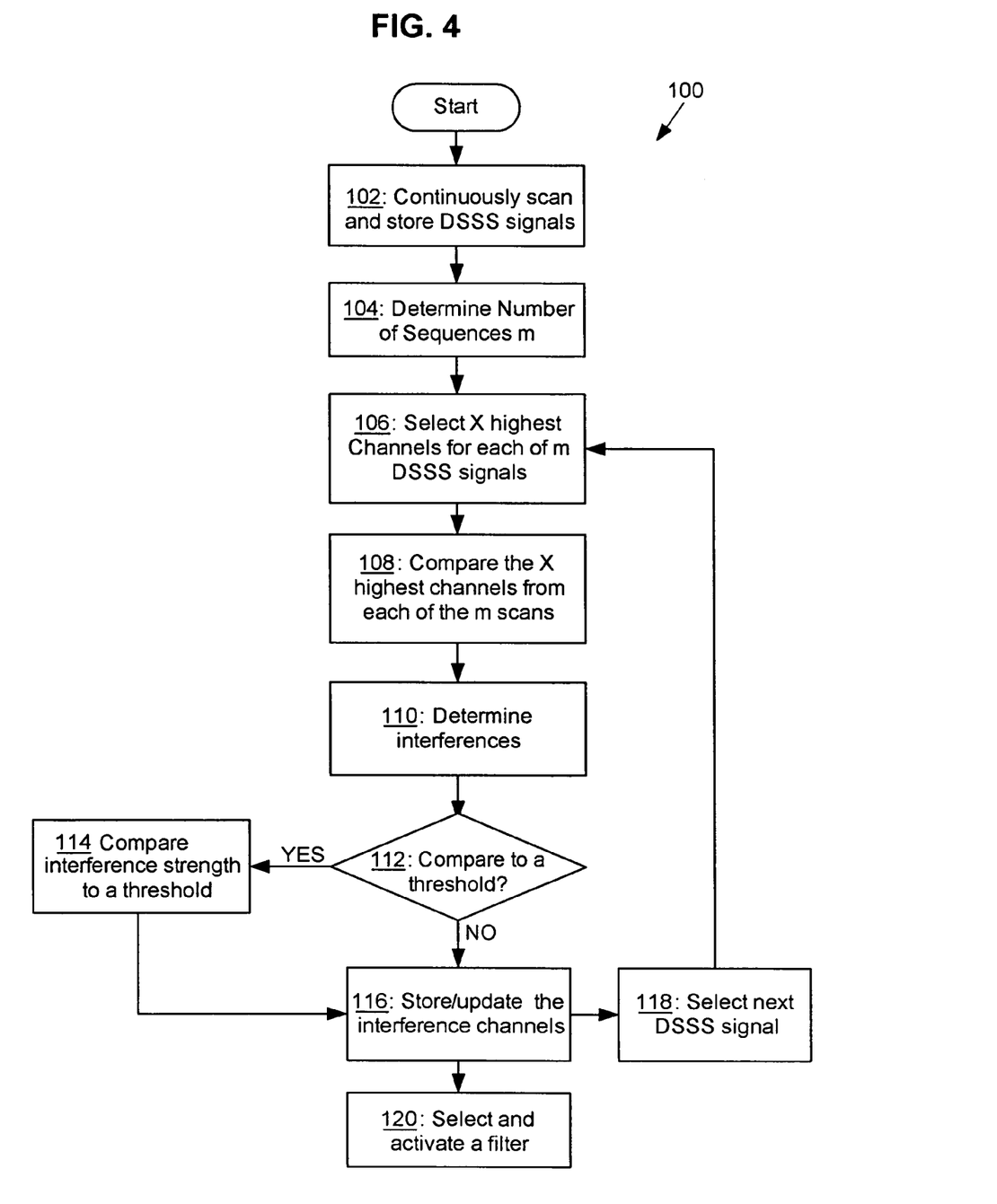
FIG. 4 is an exemplary illustration of an interference detection program.

Specifically, FIG. 4 illustrates a flowchart of an interference detection program 100 that may be used to determine location of interference in a DSSS signal. A block 102 continuously scans a series of DSSS signals and stores the observed values of the signal strengths for each of various narrowband channels located in the DSSS signal. For example, the block 102 may continuously scan the 1.2288 MHz DSSS signal 60 for each of the forty one narrowband channels dispersed within it. The block 102 may be implemented by any well known analog scanner or digital signal processor (DSP) used to scan and store signal strengths in a DSSS signal. The scanned values of narrowband signal strengths may be stored in a memory of such DSP or in any other computer readable memory. The block 102 may store the signal strength of a particular narrowband channel along with any information, such as a numeric identifier, identifying the location of that particular narrowband channel within the DSSS signal.

Subsequently, a block 104 determines the number of sequences m of a DSSS signal that may be required to be analyzed to determine narrowband channels having interference. A user may provide such a number m based on any pre-determined criteria. For example, a user may provide m to be equal to four, meaning that four consecutive DSSS signals need to be analyzed to determine if any of the narrowband channels within that DSSS signal spectrum includes an interference signal. As one of ordinary skill in the art would appreciate, the higher is the selected value of m, the more accurate will be the interference detection. However, the higher the number m is, the higher is the delay in determining whether a particular DSSS signal had an interference present in it, subsequently, resulting in a longer delay before a notch filter is applied to the DSSS signal to remove the interference signal.

Generally, detection of an interference signal may be performed on a rolling basis. That is, at any point in time, m previous DSSS signals may be used to analyze presence of an interference signal. The earliest of such m interference signals may be removed from the set of DSSS signals used to determine the presence of an interference signal on a first-infirst-out basis. However, in an alternate embodiment, an alternate sampling method for the set of DSSS signals may also be used.

Subsequently, a block 106 selects x narrowband channels having the highest signal strength from each of the m most recent DSSS signals scanned at the block 102. The number x may be determined by a user. For example, if x is selected to be equal to three, the block 106 may select three highest channels from each of the m most recent DSSS signals. The methodology for selecting x narrowband channels having highest signal strength from a DSSS signal is described in further detail in FIG. 5 below. For example, the block 106 may determine that the first of the m DSSS signals has narrowband channels 10, 15 and 27 having the highest signal strengths, the second of the m DSSS channels has narrowband channels 15 and 27 and 35 having the highest signal strengths, and the third of the m DSSS channels has the narrowband channels 15, 27 and 35 having the highest narrowband signal strength.

After having determined the x narrowband channels having the highest signal strengths in each of the m DSSS signals, a block 108 compares these x narrowband channels to determine if any of these highest strength narrowband channels appear more than once in the m DSSS signals. In case of the example above, the block 108 may determine that the narrowband channels 15 and 27 are present among the highest strength narrowband channels for each of the last three DSSS signals, while channel 35 is present among the highest strength narrowband channels for at least two of the last three DSSS signals.

Such consistent appearance of narrowband channels having highest signal strength over subsequent DSSS signals indicate that narrowband channels 15 and 27, and probably the narrowband channel 35, may have an interference signal super-imposed on them. A block 110 may use such information to determine which narrowband channels may have interference. For example, based on the number of times a given narrowband channel appears in the selected highest signal strength channels, the block 110 may determine the confidence level that may be assigned to a conclusion that a given narrowband channel contains an interference signal.

Alternatively, the block 110 may determine a correlation factor for each of the various narrowband channels appearing in the x selected highest signal strength channels and compare the calculated correlation factors with a threshold correlation factor to determine whether any of the x selected channels has correlated signal strengths. Calculating a correlation factor based on a series of observations is well known to those of ordinary skill in the art and therefore is not illustrated in further detail herein. The threshold correlation factor may be given by the user of the interference detection program 100.

Note that while in the above illustrated embodiment, the correlation factors of only the selected highest signal strength channels are calculated, in an alternate embodiment, correlation factors of all the narrowband channels within the DSSS signals may be calculated and compared to the threshold correlation factor.

Empirically, it may be shown that when m is selected to be equal to three, for a clean DSSS signal, the likelihood of having at least one match among the higher signal strength narrowband channels is 0.198, the likelihood of having at least two matches among the higher signal strength narrowband channels is 0.0106, and the likelihood of having at least three matches among the higher signal strength narrowband channels is $9.38 \times 10^{-5}$. Thus, the higher the number of matches, the lesser is the likelihood of having a determination that one of the x channels contains an interference signal (i.e., a false positive interference detection). It may be shown that if the number of scans m is increased to, say four DSSS scans, the likelihood of having such matches in m consecutive scans is even smaller, thus providing higher confidence that if such matches are found to be present, they indicate presence of interference signal in those narrowband channels.

To identify the presence of interference signals with even higher level of confidence, a block 112 may decide whether to compare the signal strengths of the narrowband channels determined to have an interference signal with a threshold. If the block 112 decides to perform such a comparison, a block 114 may compare the signal strength of each of the narrowband channels determined to have an interference with a threshold level. Such comparing of the narrowband channel signal strengths with a threshold may provide added confidence regarding the narrowband channel having an interference signal so that when a notch filter is positioned at that narrowband channel, the probability of removing a non-interfering signal is reduced. However, a user may determine that such added confidence level is not necessary and thus no such comparison to a threshold need to be performed. In which case, the control passes to a block 116, which stores the interference signals in a memory.

After storing the information about the narrowband channels having interference signals, a block 118 selects the next DSSS signal from the signals scanned and stored at the block 102. The block 118 may cause the first of the m DSSS signals to be dropped and the newly added DSSS signal is added to the set of m DSSS signals that will be used to determine presence of an interference signal (first-in-first-out). Subsequently, control is passed to the block 106 where the process of determining narrowband channels having interference signals is repeated. Finally, a block 120 may select and activate one or more notch filters that are located in the path of the DSSS signal to filter out any narrowband channel identified as having narrowband interference in it.

Figure 5:
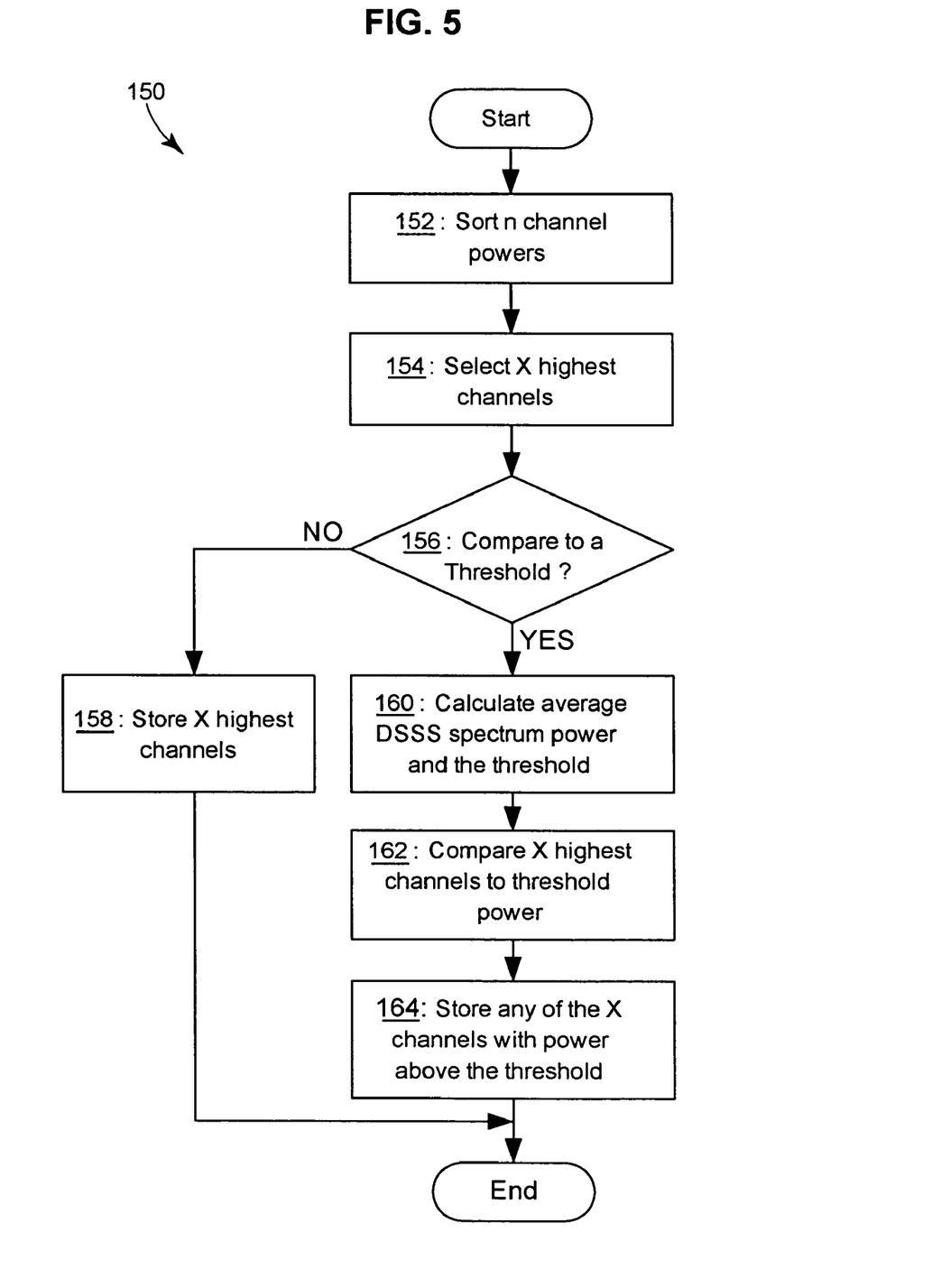
FIG. 5 is an exemplary illustration of a high strength channel detection program used by the interference detection program of FIG. 4.

Now referring to FIG. 5, a flowchart illustrates a high strength channels detection program 150 that may be used to identify various channels within a given scan of the DSSS signal that may contain an interference signal. The high strength channels detection program 150 may be used to implement the functions performed by the block 106 of the interference detection program 100. In a manner similar to the interference detection program 100, the high strength channels detection program 150 may also be implemented using software, hardware, firmware or any combination thereof.

A block 152 may sort signal strengths of each of the n channels within a given DSSS signal. For example, if a DSSS signal has forty one narrowband channels, the block 152 may sort each of the 41 narrowband channels according to its signal strengths. Subsequently, a block 154 may select the x highest strength channels from the sorted narrowband channels and store information identifying the selected x highest strength channels for further processing. An embodiment of the high strength channels detection program 150 may simply use the selected x highest strength channels from each scan of the DSSS signals to determine any presence of interference in the DSSS signals. However, in an alternate embodiment, additional selected criteria may be used.

Subsequently, a block 156 determines if it is necessary to compare the signal strengths of the x highest strength narrowband channels to any other signal strength value, such as a threshold signal strength, etc., where such a threshold may be determined using the average signal strength across the DSSS signal. For example, the block 156 may use a criterion such as, for example: "when x is selected to be four, if at least three out of four of the selected narrowband channels have also appeared in previous DSSS signals, no further comparison in necessary." Another criterion may be, for example: "if any of the selected narrowband channels is located at the fringe of the DSSS signal, the signal strengths of such narrowband channels should be compared to a threshold signal strength." Other alternate criteria may also be provided.

If the block 156 determines that no further comparison of the signal strengths of the selected x narrowband channels is necessary, control is passed to a block 158, which stores information about the selected x narrowband channels in a memory for further processing. If the block 156 determines that it is necessary to apply further selection criteria to the selected x narrowband channels, control is passed to a block 160. The block 160 may determine a threshold value against which the signal strengths of each of the x narrowband channels are compared based on a predetermined methodology.

For example, in an embodiment, the block 160 may determine the threshold based on the average signal strength of the DSSS signal. The threshold signal strength may be the average signal strength of the DSSS signal or a predetermined value may be added to such average DSSS signal to derive the threshold signal strength.

Subsequently, a block 162 may compare the signal strengths of the selected x narrowband channels to the threshold value determined by the block 160. Only the narrowband channels having signal strengths higher than the selected threshold are used in determining presence of interference in the DSSS signal. Finally, a block 164 may store information about the selected x narrowband channels having signal strengths higher than the selected threshold in a memory. As discussed above, the interference detection program 100 may use such information about the selected narrowband channels to determine the presence of interference signal in the DSSS signal.

The interference detection program 100 and the high strength channel detection program 150 may be implemented by using software, hardware, firmware or any combination thereof. For example, such programs may be stored on a memory of a computer that is used to control activation and deactivation of one or more notch filters. Alternatively, such programs may be implemented using a digital signal processor (DSP) which determines the presence and location of interference channels in a dynamic fashion and activates/deactivates one or more notch filters.

Figure 6:
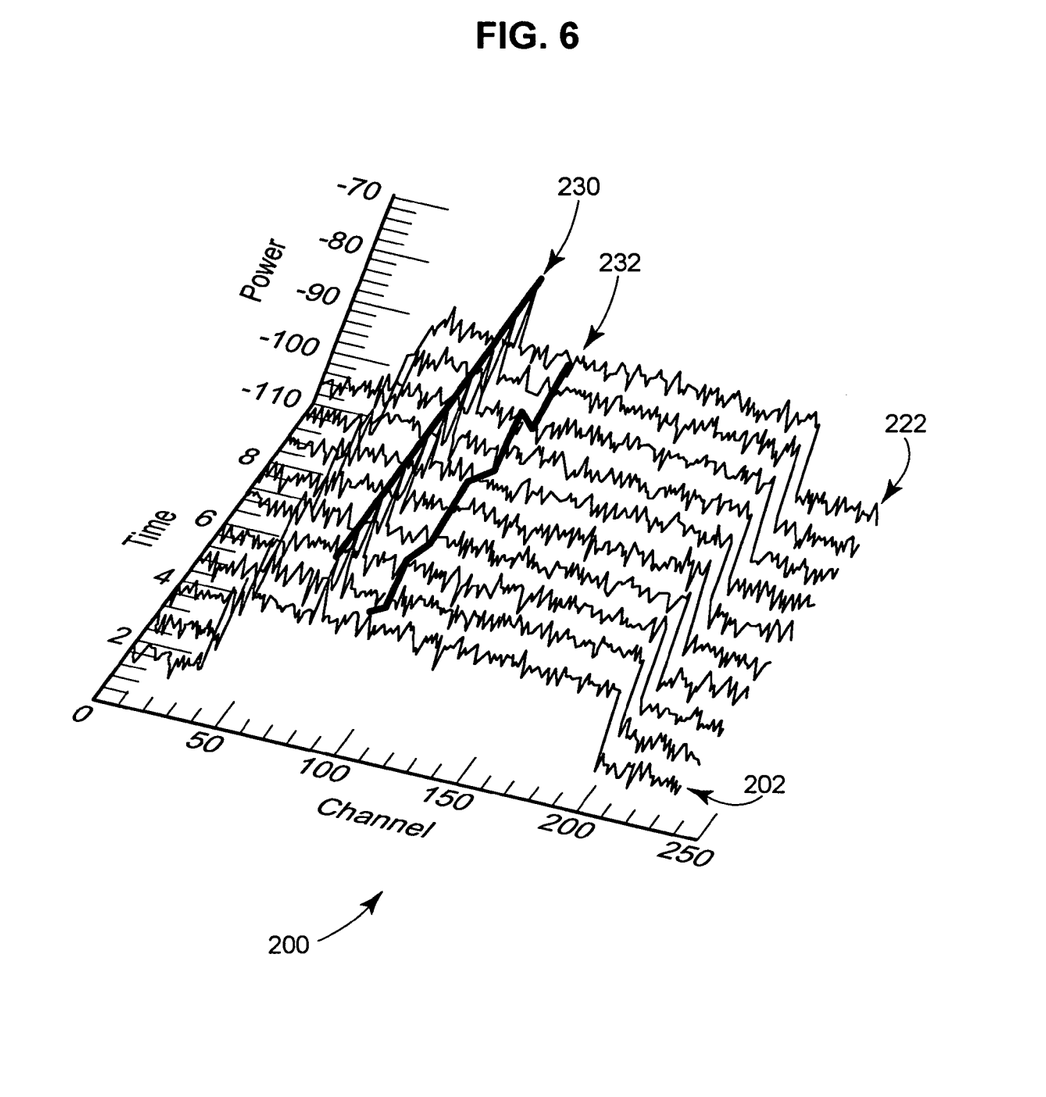
FIG. 6 is an illustration of a series of consecutive DSSS signals having an interference signal.

FIG. 6 illustrates a three dimensional graph 200 depicting several DSSS signals 202-222 over a time period. A first axis of the graph 200 illustrates the number of narrowband channels of the DSSS signals 202-222, a second axis illustrates time over which a number of DSSS signals 202-222 are scanned, and a third axis illustrates the power of each of the narrowband channels. The DSSS signals 202-222 are shown to be affected by an interference signal 230.

The interference detection program 100 may start scanning various DSSS signals 202-222 starting from the first DSSS signal 202. As discussed above the block 104 determines the number m of the DSSS signals 202-222 that are to be scanned. Because the interference signal 230 causes the signal strength of a particular narrowband channel to be consistently higher than the other channels for a number of consecutive scans of the DSSS signals 202-222, the block 110, will identify that particular channel to have an interference signal present in there. Subsequently, the block 120 will select and activate a notch filter that applies the filter function as described by equation 1, to the narrowband channel having interference.

The graph 200 also illustrates the average signal strengths of each of the DSSS signals 202-222 by a line 232. As discussed above, the block 162 may compare the signal strengths of each of the x selected narrowband channels from the DSSS signals 202-222 with the average signal strength, as denoted by line 232, in that particular DSSS signal.

Figure 7:
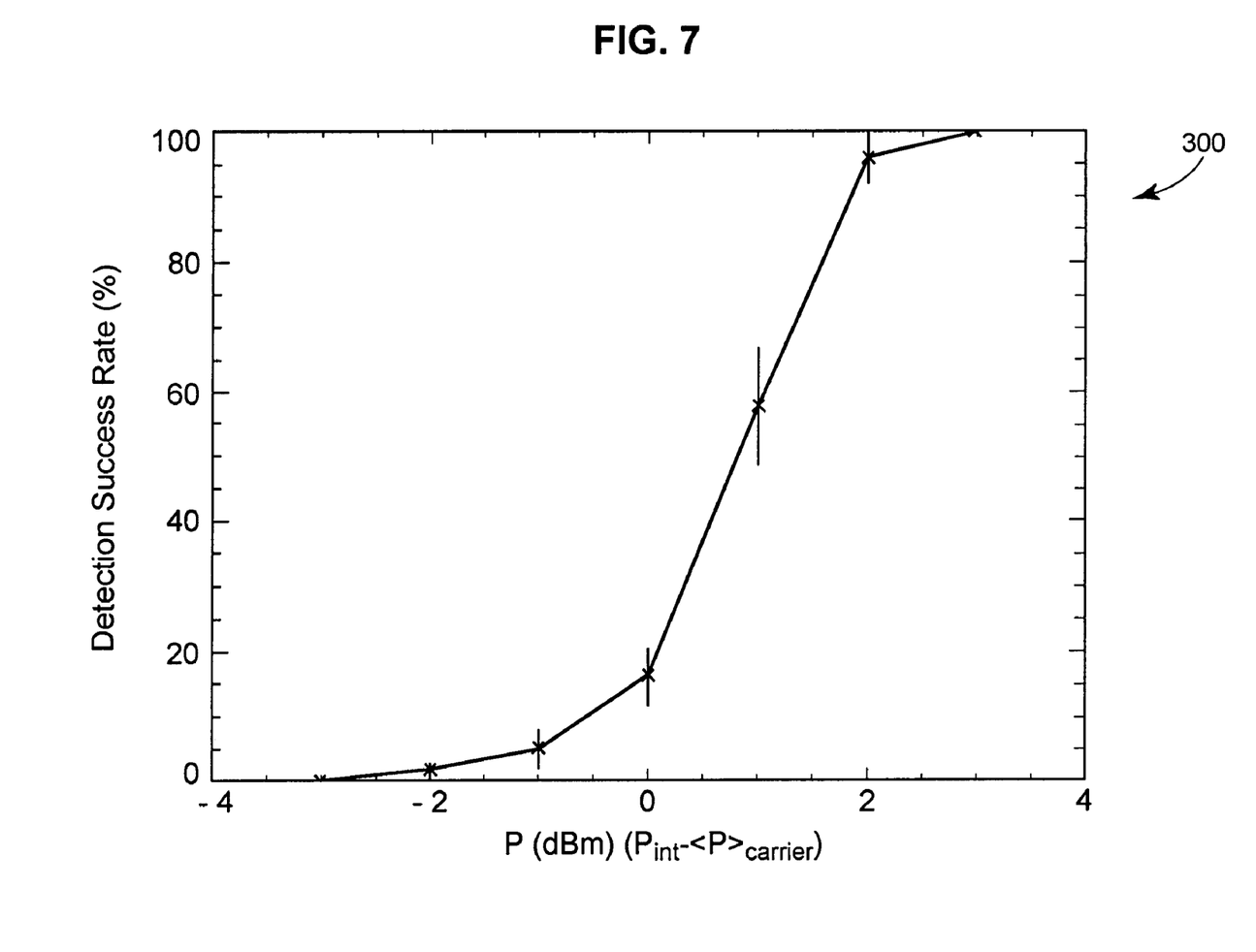
FIG. 7 is a graph depicting interference detection efficiency of the system described herein.

Now referring to FIG. 7, a graph 300 illustrates interference detection success rate of using the interference detection program 100, as a function of strength of an interference signal affecting a DSSS signal. The x-axis of the graph 300 depicts the strength of interference signal relative to the strength of the DSSS signal, while the y-axis depicts the detection success rate in percentages. As illustrated, when an interference signal has a strength of at least 2 dB higher than the strength of the DSSS signal, such an interference signal is detected with at least ninety five percent success rate.

Figure 8:
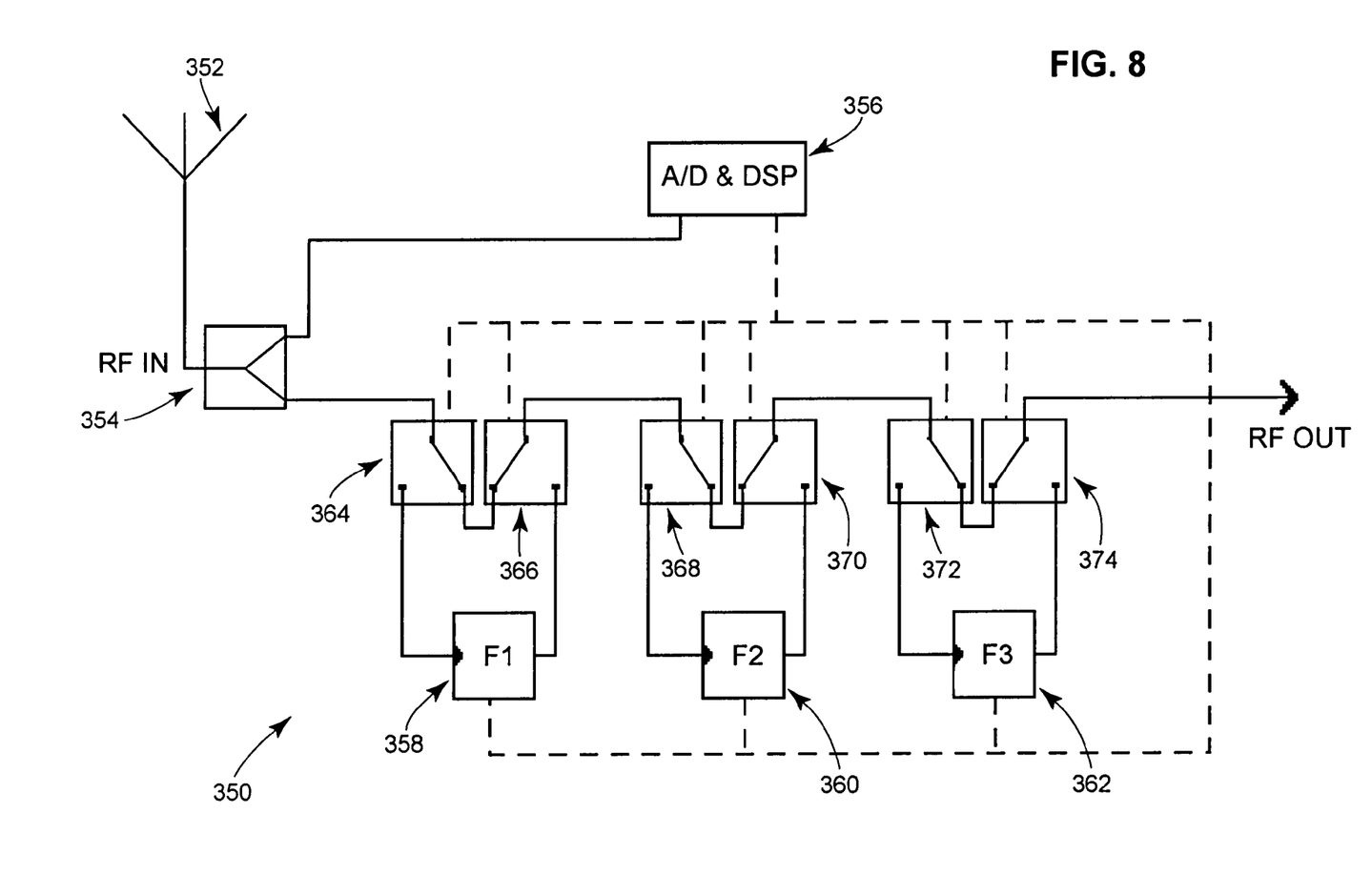
FIG. 8 is an illustration of an interference detection system using the interference detection program of FIG. 4.

FIG. 8 illustrates an implementation of an interference detection system 350 that may use the interference detection program 100 to operate one or more notch filters. Specifically, the interference detection system 350 may include an antenna 352 for receiving RF signal, a signal splitter 354, an analog-to-digital converter/digital signal processor (A/D & DSP) 356, and a plurality of notch filters 358-362. The A/D & DSP 356 processes a number of narrowband channels disposed within the signal received from the signal splitter 354 using the interference detection program 100 to identify a plurality of narrowband channels that may be affected by an interference signal.

The A/D & DSP 356 may also control a plurality of switches 364-374 in a manner so that when any of the plurality of notch filters 358-362 is activated, such an activated notch filter receives the RF signal output from the signal splitter 354. Subsequently, the A/D & DSP 356 may specify the narrowband frequency at which such an activated notch filter is to operate, so as to remove the interference at the specified narrowband frequency. The interference detection system 350 generates RF output signal that is generally free of the interferences detected by the interference detection program 100. Note that while the interference detection system 350 is illustrated in FIG. 8 to have three notch filters, in an alternate implementation, an alternate number of notch filters may be used.

While the interference detection program 100 is described above with respect to the IS-95 CDMA signal 60, one of ordinary skill in the art would understand that such an interference detection program may also be applied to any other DSSS signal such as an IS-2000 1xRTT signal, an IS-856 evolution data only (EVDO) signal, a universal mode telephone service (UMTS)/wide-band CDMA signal, etc.

Numerous modifications and alternative embodiments of the system and method described above will be apparent to those skilled in the art in view of the foregoing description. For example, while the foregoing description specifically addressed the concept of eliminating interference from 200 kHz narrowband channels on a 1.25 MHz CDMA carrier signal, it may be readily appreciated that such concepts could be applied to CDMA carrier signals having, for example, 5, 10 or 15 MHz bandwidths or to contiguous channels that have an aggregate bandwidth of, for example, 5, 10 or 15 MHz. Similarly, various functions performed by various blocks of the interference detection program 100 and the high strength channel detection program 150 may be performed in an alternate order. Accordingly, this description is to be construed as illustrative only and not as limiting to the scope of the invention. The details of the methodology may be varied substantially without departing from the spirit of the invention, and the exclusive use of all modifications, which are within the scope of the appended claims, is reserved.

What is claimed is:

1. A method, performed by a mobile unit or base station, for detecting narrowband interference in a wideband communication signal having a frequency bandwidth with a narrowband channel disposed therein, the method comprising:
scanning the narrowband channel a plurality of times to determine a plurality of signal strengths at each of the plurality of scans;
determining a correlation factor for the narrowband channel based on the plurality of signal strengths;
comparing the correlation factor with a threshold correlation factor to determine presence of the narrowband interference in the narrowband channel;
wherein scanning the narrowband channel a plurality of times further comprises
continuously scanning the narrowband channel to generate a plurality of narrowband scans, and
storing a plurality of signal strength observations, each of the plurality of signal strength observations corresponding to one of the plurality of narrowband scans; and
wherein determining the correlation factor further comprises using a subset of the plurality of signal strength observations, wherein the subset of the plurality of signal strength observations are the most recent of the plurality of signal strength observations.

2. The method of claim 1, wherein the wideband communication signal is a direct sequence spread spectrum signal.

3. The method of claim 1, wherein the wideband communication signal is at least one of: (1) an IS-95 code division multiple access signal; (2) an IS-2000 code division multiple access signal; (3) a universal mode telephone service/wideband code division multiple access signal; or (4) an IS-856 code division multiple access signal.

4. The method of claim 1, wherein:
scanning the narrowband channel a plurality of times further includes scanning a plurality of narrowband channels a plurality of times;
determining the correlation factor for the narrowband channel further includes determining a plurality of correlation factors for each of the plurality of narrowband channels; and
comparing the correlation factor with a threshold correlation factor further includes comparing each of the plurality of correlation factors with the threshold correlation factor to determine presence of narrowband interference in each of the plurality of narrowband channels.

5. The method of claim 4, further comprising:
for each scanning of the plurality of channels, determining a group of narrowband channels that have the highest signal strengths during the scan; and
determining if any of the group of narrowband channels is present in groups of channels having the highest signal strengths in at least two subsequent scans.

6. The method of claim 5, wherein determining if any of the group of narrowband channels is present in groups of channels having the highest signal strengths in at least two subsequent scans comprises determining if at least two of the group of narrowband channels are present in groups of channels having the highest signal strengths in the at least two subsequent scans.

7. The method of claim 4, further comprising:
calculating an average signal strength during a particular scan of the plurality of narrowband channels; and
determining a particular narrowband channel having narrowband signal strength above the average signal strength by at least a first threshold to determine presence of narrowband interference in each of the plurality of narrowband channels.

8. The method of claim 7, further comprising:
receiving a first criteria; and
in response to the first criteria determining a narrowband channel having interference by selecting one of: (1) a particular narrowband channel having narrowband signal strength above the average signal strength by at least a first threshold; or (2) a particular narrowband channel having a correlation factor above a threshold correlation factor.

9. A method, performed by a mobile unit or base station, for detecting narrowband interference in a wideband communication signal having a frequency bandwidth with a plurality of narrowband channels disposed therein, the method comprising:
scanning the plurality of narrowband channels a plurality of times to determine a plurality of signal strengths, each of the plurality of signal strengths corresponding to a particular scan of a particular narrowband channel;
selecting a first number of narrowband channels, wherein the first number of narrowband channels have highest signal strengths for the first scan;
selecting a second number of narrowband channels, wherein the second number of narrowband channels have highest signal strengths for the second scan;
determining if any of the first number of narrowband channels corresponds to any of the second number of narrowband channels to identify a narrowband channel having interference;
determining a first threshold based on the plurality of narrowband signal strengths for the first number of narrowband channels; and
determining a second threshold based on the plurality of narrowband signal strengths for the second number of narrowband channels.

10. The method of claim 9, wherein the wideband communication signal is at least one of: (1) an IS-95 code division multiple access signal; (2) an IS-2000 code division multiple access signal; (3) a universal mode telephone service/wideband code division multiple access signal; or (4) an IS-856 code division multiple access signal.

11. The method of claim 9, wherein:
selecting a first number of narrowband channels further comprises selecting narrowband channels with signal strengths for the first scan above the first threshold; and
selecting a second number of narrowband channels further comprises selecting narrowband channels with signal strength for the second scan above the second threshold.

12. The method of claim 9, further comprising removing the narrowband interference using a notch filter.

13. An interference detection system for detecting narrowband interference within a wideband communication signal with a plurality of narrowband channels disposed therein, the system comprising:
a wideband signal receiver to receive the wideband signal;
a narrowband signal strength scanner to scan a plurality of narrowband channels to determine narrowband channel signal strengths for each of the plurality of scans; and
a digital signal processor to process the plurality of narrowband channel signal strengths for each of the plurality of scans to determine a plurality of correlation factors and to compare the plurality of correlation factors to a threshold correlation factor to determine a narrowband channel having the narrowband interference, wherein the digital signal processor is further to:

determine average signal strengths for each of the plurality of scans;

calculate a plurality of threshold signal strengths corresponding to the plurality of scans based on the average signal strengths for each of the plurality of scans; and determine a group of narrowband channels for each of the plurality of scans having signal strengths above the threshold signal strength corresponding to each of the plurality of scans.

14. The system of claim 13, wherein the digital signal processor is further to determine if any of the group of narrowband channels are present in at least two subsequent scans.

15. The system of claim 13, further comprising a notch filter to receive information identifying the narrowband channel having the interference signal from the digital signal processor and to remove the interference signal from the wideband communication signal.

16. The system of claim 13, wherein the wideband signal receiver is further to receive at least one of: (1) an IS-95 code division multiple access signal; (2) an IS-2000 code division multiple access signal; (3) a universal mode telephone service/wide-band code division multiple access signal; or (4) an IS-856 code division multiple access signal.

* * * * *

UNITED STATES PATENT AND TRADEMARK OFFICE
CERTIFICATE OF CORRECTION

PATENT NO.        : 7,525,942 B2
APPLICATION NO.   : 11/217717
DATED             : April 28, 2009
INVENTOR(S)       : Sean S. Cordone Page 1 of 1

It is certified that error appears in the above-identified patent and that said Letters Patent is hereby corrected as shown below:

On the Cover Page:

Item (*), add -- This patent is subject to a terminal disclaimer. --.

Signed and Sealed this

Eighteenth Day of August, 2009

David J. Kappos
*Director of the United States Patent and Trademark Office*